US012695785B2

(12) United States Patent (10) Patent No.: US 12,695,785 B2
Jeevagunta et al. (45) Date of Patent: *Jul. 28, 2026

(54) PASSIVE DETECTION OF DIGITAL SKIMMING ATTACKS

(71) Applicant: Cequence Security, Inc., Sunnyvale, CA (US)

(72) Inventors: Abraham Jeevagunta, San Jose, CA (US); Shreyans Mehta, Los Altos, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/783,834

(22) Filed: Jul. 25, 2024

(65) Prior Publication Data

US 2024/0388601 A1 Nov. 21, 2024

Related U.S. Application Data

(63) Continuation of application No. 17/387,264, filed on Jul. 28, 2021, now Pat. No. 12,074,903.

(60) Provisional application No. 63/057,714, filed on Jul. 28, 2020.

(51) Int. Cl.
*H04L 29/06* (2006.01)
*H04L 9/40* (2022.01)
(52) U.S. Cl.
CPC ........ *H04L 63/145* (2013.01); *H04L 63/1416* (2013.01); *H04L 63/1425* (2013.01); *H04L 63/20* (2013.01)

(58) Field of Classification Search
CPC ............. H04L 63/1416; H04L 63/1425; H04L 63/145; H04L 63/20
See application file for complete search history.

(56) References Cited

U.S. PATENT DOCUMENTS

| | | | |
|---|---|---|---|
| 11,070,579 B1 | 7/2021 | Kiernan et al. | |
| 11,134,058 B1 | 9/2021 | Sole et al. | |
| 2017/0024566 A1 | 1/2017 | Kuykendall et al. | |
| 2018/0121659 A1* | 5/2018 | Sawhney | ............... G06F 21/566 |
| 2018/0336348 A1* | 11/2018 | Ng | .......................... G06F 21/52 |

(Continued)

OTHER PUBLICATIONS

Nguyen, "Large-Scale Detection of DOM-based XSS based on Publisher and Subscriber Model", 2016, Hongik University (Year 2016).

*Primary Examiner* — Thong P Truong

(57) ABSTRACT

Techniques to facilitate prevention of malicious attacks on a web service are disclosed herein. In at least one implementation, web resources associated with the web service are crawled to obtain information about internal and external web assets associated with the web service. Responses from the internal and external web assets are intercepted and content security policy headers are dynamically injected into the responses to determine internal and external dependency data associated with the internal and external web assets. The internal and external dependency data is processed with script reputation and domain reputation data to generate enriched dependency graph data. The enriched dependency graph data is analyzed to dynamically generate content security policies for the web service, and the dynamically generated content security policies are deployed to protect the web service.

20 Claims, 6 Drawing Sheets

(56)  References Cited

U.S. PATENT DOCUMENTS

| | | |
|---|---|---|
| 2019/0238544 A1 | 8/2019 | Rajahram et al. |
| 2021/0185008 A1 | 6/2021 | Nagaraja et al. |
| 2021/0288937 A1 | 9/2021 | Mjayvargiya et al. |

* cited by examiner

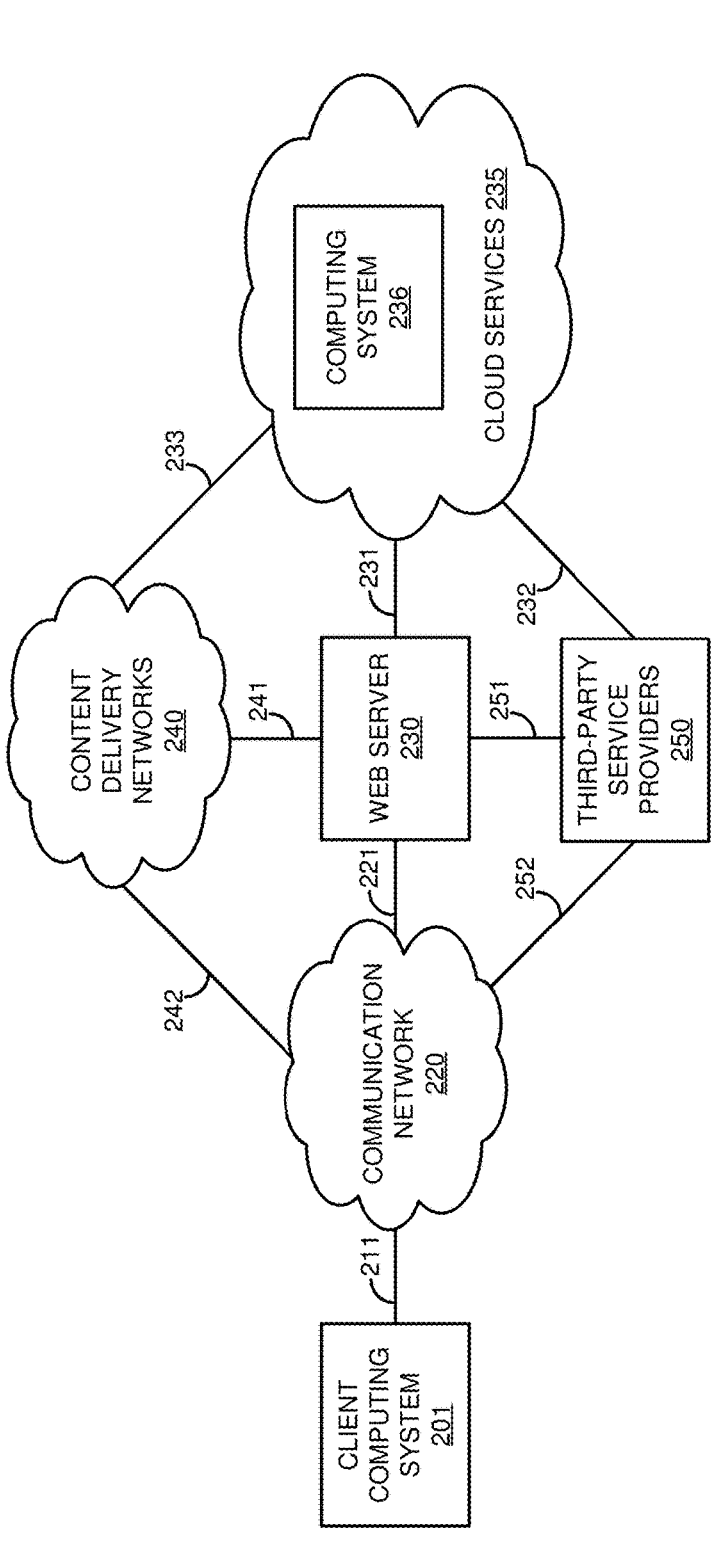
FIGURE 2

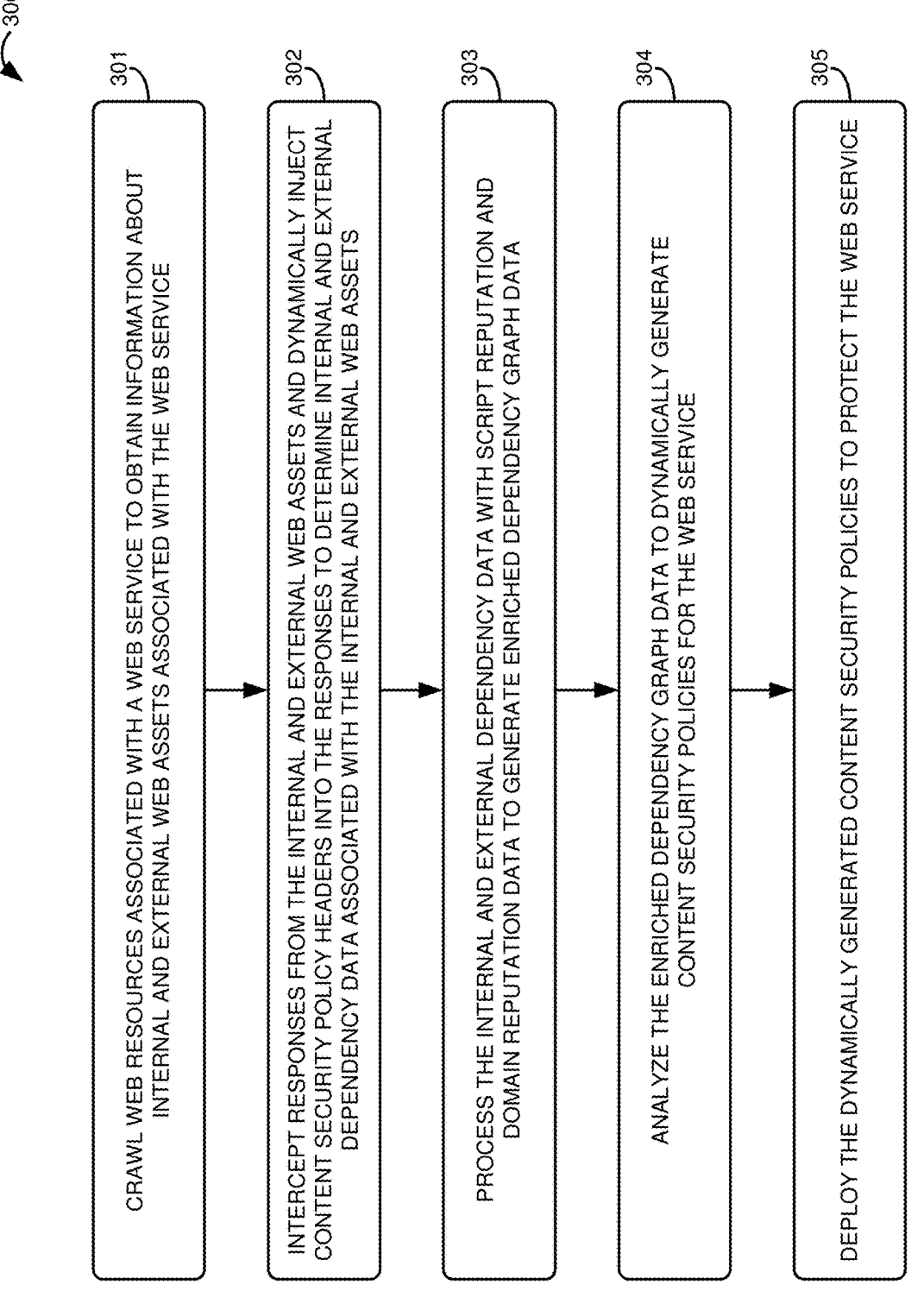

300

301 CRAWL WEB RESOURCES ASSOCIATED WITH A WEB SERVICE TO OBTAIN INFORMATION ABOUT INTERNAL AND EXTERNAL WEB ASSETS ASSOCIATED WITH THE WEB SERVICE

302 INTERCEPT RESPONSES FROM THE INTERNAL AND EXTERNAL WEB ASSETS AND DYNAMICALLY INJECT CONTENT SECURITY POLICY HEADERS INTO THE RESPONSES TO DETERMINE INTERNAL AND EXTERNAL DEPENDENCY DATA ASSOCIATED WITH THE INTERNAL AND EXTERNAL WEB ASSETS

303 PROCESS THE INTERNAL AND EXTERNAL DEPENDENCY DATA WITH SCRIPT REPUTATION AND DOMAIN REPUTATION DATA TO GENERATE ENRICHED DEPENDENCY GRAPH DATA

304 ANALYZE THE ENRICHED DEPENDENCY GRAPH DATA TO DYNAMICALLY GENERATE CONTENT SECURITY POLICIES FOR THE WEB SERVICE

305 DEPLOY THE DYNAMICALLY GENERATED CONTENT SECURITY POLICIES TO PROTECT THE WEB SERVICE

FIGURE 3

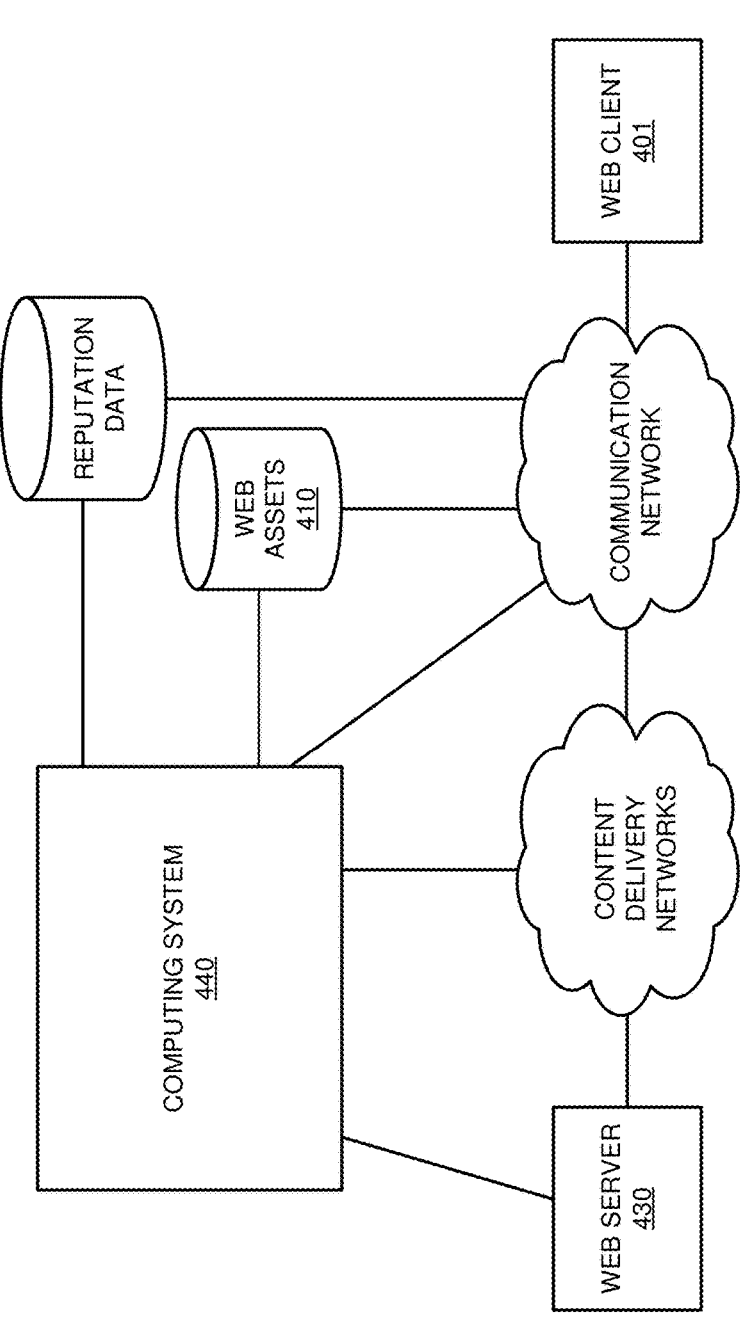
FIGURE 4

PASSIVE DETECTION OF DIGITAL SKIMMING ATTACKS

RELATED APPLICATIONS

This application claims the benefit of, and priority to, U.S. patent application Ser. No. 17/387,264, filed Jul. 28, 2021 which claims the benefit of, and priority to, U.S. Provisional Patent Application No. 63/057,714, filed Jul. 28, 2020, both of which are hereby incorporated by reference in their entirety for all purposes.

TECHNICAL BACKGROUND

Security of a web service is of upmost importance to both the operators of the website and its users. As more people utilize the Internet to communicate and conduct business transactions and other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, dependencies on compromised third-party providers, and other security threats.

Digital skimming is a growing security problem for web applications that results in the theft of sensitive user information such as user credentials, credit card numbers, social security numbers, and other private information. In some examples, digital skimming can occur when an element of malicious JavaScript code is inserted somewhere in the web application that allows a remote attacker to skim sensitive user inputs, or a malicious iframe is created with a fake user input form. This threat is particularly dangerous for companies that depend on third-party providers to manage certain aspects of their web service, such as user registration, login, payment, checkout, advertising, usage tracking, and other services. In such cases, when the compromised code is introduced from a third-party provider that the site depends on, users of the website may have their sensitive data stolen, even though the website itself was never breached. Additionally, when websites are breached directly, either through takeover of administrator credentials or some other known vulnerability, attackers can place malicious elements directly into the code of the website, which often remain undetected for long periods of time.

Overview

Techniques to facilitate prevention of malicious attacks on a web service are disclosed herein. In at least one implementation, web resources associated with the web service are crawled to obtain information about internal and external web assets associated with the web service. Responses from the internal and external web assets are intercepted and content security policy headers are dynamically injected into the responses to determine internal and external dependency data associated with the internal and external web assets. The internal and external dependency data is processed with script reputation and domain reputation data to generate enriched dependency graph data. The enriched dependency graph data is analyzed to dynamically generate content security policies for the web service, and the dynamically generated content security policies are deployed to protect the web service.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 2 is a block diagram that illustrates a communication system in an exemplary embodiment.

FIG. 3 is a flow diagram that illustrates an exemplary operation of the communication system.

FIG. 4 is a block diagram that illustrates a communication system in an exemplary embodiment.

DETAILED DESCRIPTION

Figure 1:
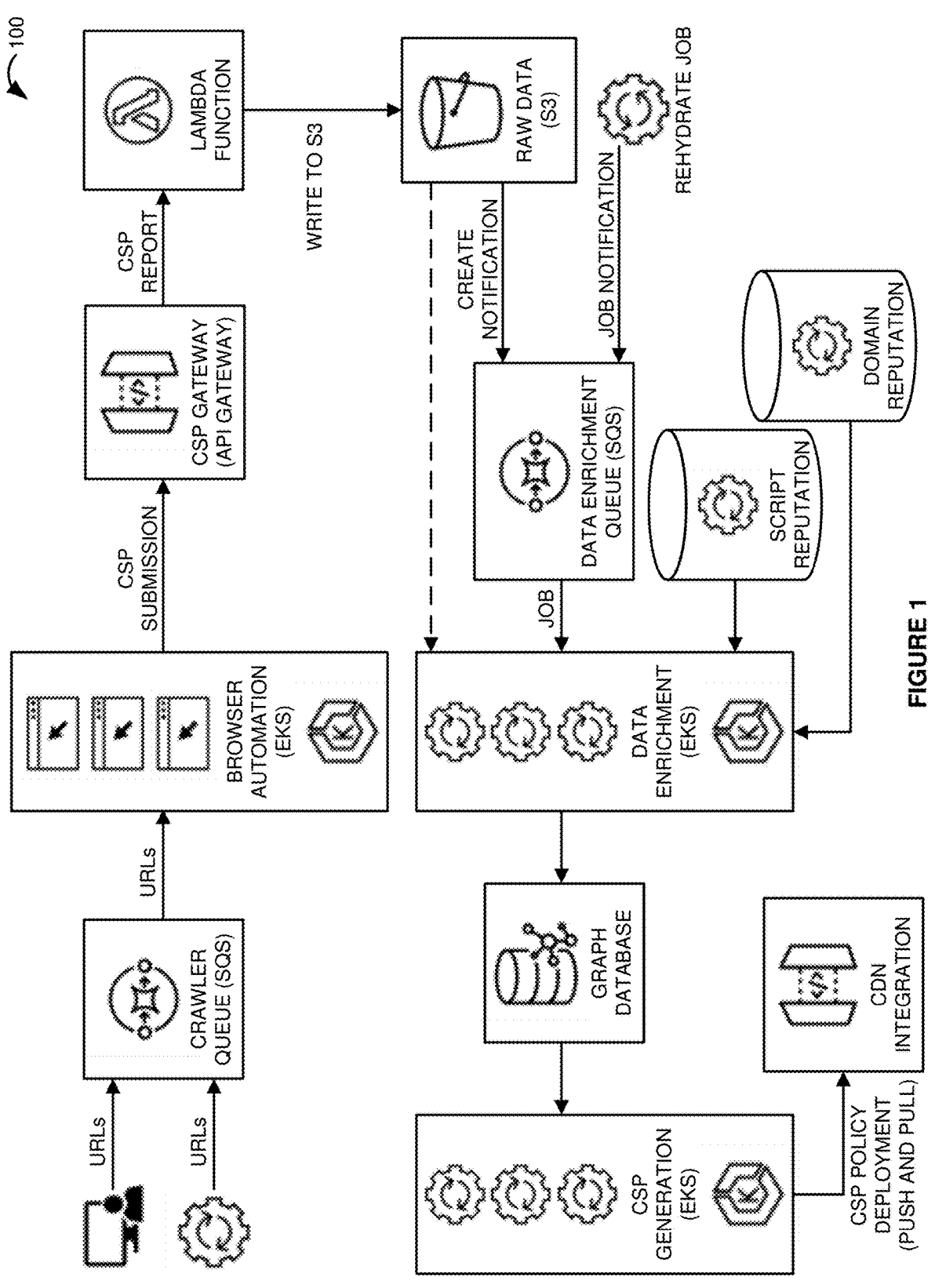
FIG. 1 is a block diagram that illustrates an operation of a communication system in an exemplary embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Digital skimming attacks, also known as Magecart attacks, JavaScript sniffing, and web skimming, are an increasing problem for website owners and the security of private user information. Digital skimming attacks are typically carried out by attackers installing their own malicious JavaScript code on websites, either by directly embedding the code on a website itself or indirectly through third-party service providers that the site depends on. The undetected malicious code then functions to skim user account credentials, credit card information, and other sensitive data while users are interacting with the website.

As a website owner, it is very difficult to control the development and security of third-party tools and services. Further, because third-party JavaScript code and third-party browser extensions get loaded by client browsers at runtime, the website owner has little to no transparency into what is actually being added or downloaded at the individual browser level from third-party application servers. To help combat code injection attacks and cross-site scripting, modern web browsers support content security policy (CSP), which enables website administrators to specify the domains that the browser can trust as valid sources of executable scripts and other code. Subresource integrity (SRI) is a similar security mechanism that is often utilized in conjunction with CSP to protect website integrity. By specifying what resources a website depends on along with their approved origins and security hashes, SRI can be used to validate web assets provided by third parties, such as content delivery networks (CDNs) and other third-party services. To enable CSP, a website administrator needs to configure the web server to return the Content-Security-Policy hypertext transfer protocol (HTTP) header and provide values to specify resources the browser is allowed to load. However, because creating and maintaining these policies is a very laborious and manual process, it can be difficult and burdensome for website developers and administrators to implement CSP and SRI and keep up to date with changes on the site and changes made by third-party service providers.

The techniques disclosed herein provide for the protection of web applications from digital skimming attacks by automatically determining dependencies of the web service and then dynamically generating content security policies based on the dependency information. By utilizing browser automation and a novel browser extension, the digital skimming detection and protection system described herein operates by passively scanning web applications using a scalable system of crawlers and graph analysis to dynamically generate content security policies. The dependency and domain data that is acquired by passively crawling the website may be enriched with script reputation and domain reputation data, and the resulting reputation-enriched dependency data may then be represented in graph data format. Content security policies are then dynamically created periodically from graph data analysis, which may then be deployed via CDNs and application integration to protect the web service. These techniques provide an advantage by enabling website administrators to detect digital skimming attacks without any active page modification or changes to CDNs or application servers. The system affords website owners with visibility into third-party dependencies to help make them aware of the JavaScript code and other web assets that are being rendered on their site at the client browser level. Further, with the knowledge that these techniques provide about the reputation of the domains that assets on the website communicate with, the website operators can engage in reporting and enforcement of policies designed to protect their site from digital skimming attacks.

Figure 5:
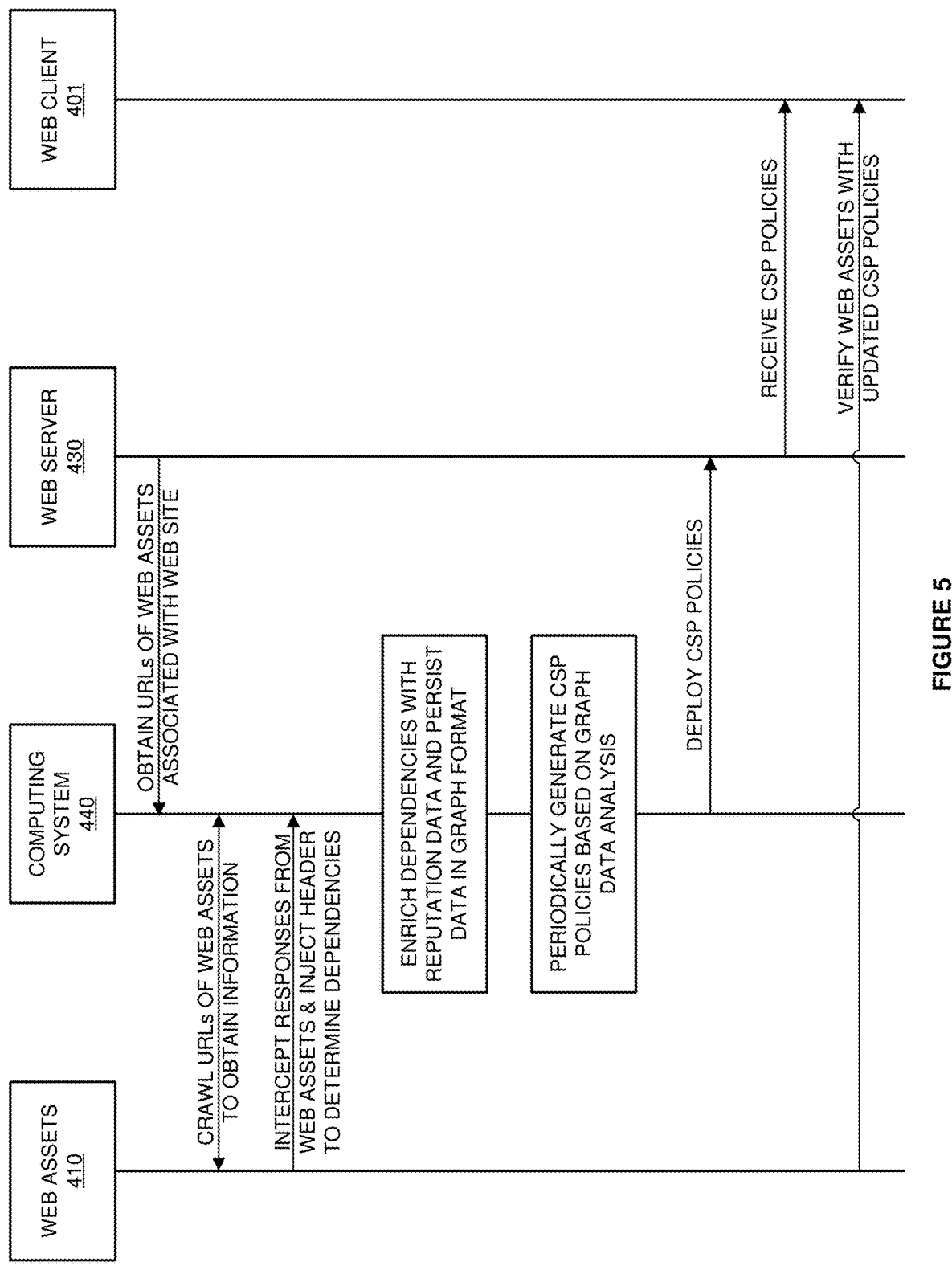
FIG. 5 is a sequence diagram that illustrates an exemplary operation of the communication system.
Figure 6:
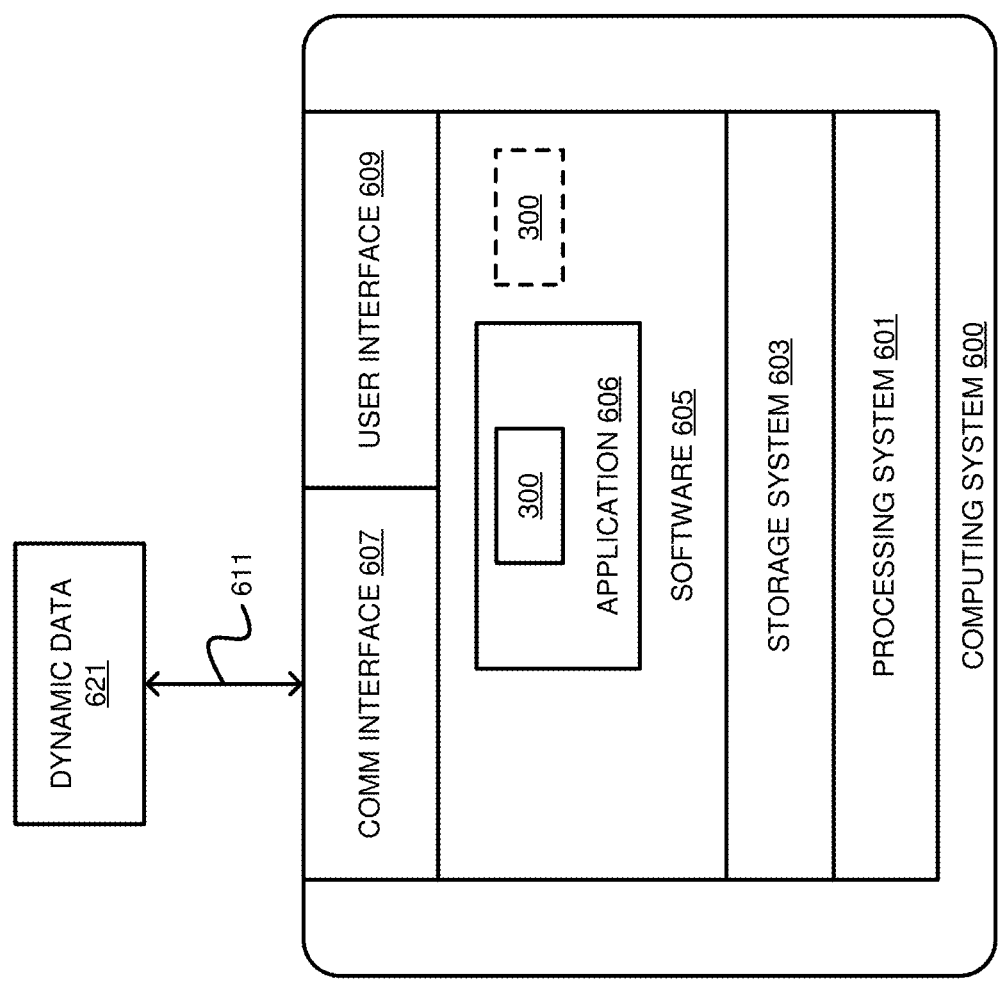
FIG. 6 is a block diagram that illustrates a computing system.

Referring now to the drawings, FIG. 1 illustrates a communication system that describes the design and flow of a digital skimming detection and protection system in an exemplary implementation. FIG. 2 illustrates another communication system that may be used to detect digital skimming attacks on a web service in an exemplary embodiment. FIG. 3 illustrates a flow diagram of an exemplary operation to facilitate prevention of malicious digital skimming attacks on a web service. FIG. 4 illustrates another communication system that may be used to detect digital skimming attacks on a web service in an exemplary embodiment. FIG. 5 illustrates a sequence diagram of an exemplary operation to prevent malicious digital skimming attacks on a website. FIG. 6 illustrates an exemplary computing system that may be used to perform any of the digital skimming detection processes and operational scenarios described herein. One possible design and operational flow of a digital skimming detection and protection system will now be described in detail with respect to FIG. 1.

Turning now to FIG. 1, communication system 100 illustrates an exemplary design and operational flow of a digital skimming detection and protection system in an exemplary implementation. Communication system 100 provides an example of a system that may be used to implement a digital skimming detection process to facilitate prevention of malicious attacks on a web service as described herein. Communication system 100 provides an example of one possible implementation of a digital skimming detection and protection architecture that may be employed to implement a digital skimming detection process as described herein, but note that other implementations could employ different architectures with additional and/or alternative components, services, and systems. The techniques described below with respect to FIG. 1 could be combined with operation 300 of FIG. 3 in some implementations.

In this example, the website and uniform resource locators (URLs) to crawl are added to a crawler queue. The URLs can either be manually submitted to the queue or could be automated to periodically re-crawl existing URLs, such as on a daily basis. In this example, the crawler queue is implemented using Amazon® Simple Queue Service (SQS), but any suitable message queuing service could also be used, such as Microsoft® Azure™ Service Bus, Kafka, Redis, ActiveMQ, RabbitMQ, and others. When setting up automated URL crawling, a time-based job scheduler such as cron jobs could be created to wake up periodically to re-crawl existing URLs. In this example, the cron jobs for the automated URL crawling could be created using Amazon® Elastic Kubernetes Service (EKS), but any suitable Kubernetes service could also be used, such as Microsoft® Azure™ Kubernetes Service, Google® Kubernetes Engine, Kubernetes Operations (kops), open-source Kubernetes (K8s), Rancher, and others.

Once the website and specified URLs are loaded into the crawler queue, the website and URLs are crawled to obtain information about third-party external JavaScript assets, as well as first-party internal JavaScript assets, and the domains to which these scripts call or send data outbound from pages belonging to the web service being protected. In particular, each URL gets picked up by one of the auto-scalable crawlers using headless browser automation with a specialized security scanner browser extension that intercepts and injects a CSP header into the responses to collect CSP and SRI information. The automated browsers load each page and using their built-in CSP report-only mechanism (i.e., HTTP Content-Security-Policy-Report-Only response header), the browsers report all internal and external dependencies to a CSP application programming interface (API) gateway. The CSP gateway invokes the Amazon® Web Services (AWS) Lambda function with all the submitted information in a CSP report. Although this example utilizes the AWS Lambda compute service, any other suitable event-driven serverless compute platform could also be used, such as Serverless Framework Open Source, Microsoft® Azure™ Functions, Google® App Engine, or any other compute service.

In this example, the Lambda function writes the raw data to Amazon® Simple Storage Service (S3) buckets for long-term storage, but any other storage service could also be used, such as Microsoft® Azure™ Blob Storage, Google® Cloud Storage, Zadara® Storage, IBM® Cloud Object Storage, Oracle® Cloud Infrastructure Object Storage, MinIO®, Cloudian®, or any other object storage service. The S3 write notification for the CSP report file automatically adds a new job to the data enrichment queue, which in this example is implemented using SQS, although any suitable message queuing service could also be used. New jobs can also be added manually to the data enrichment queue from the past S3 data to rehydrate and rebuild the graph data from scratch.

The jobs in the data enrichment queue are picked up and processed by the data enrichment drivers, which in this example are implemented using EKS, although any suitable Kubernetes service could also be used. The data enrichment drivers enrich the raw data from the CSP report with script reputation and domain reputation data and persist the data in graph format to a graph database. The script reputation and domain reputation data may be based on both publically-available reputation information and internal reputation monitoring and scoring algorithms in some implementations.

The CSP generation component then automatically creates policies periodically from graph data analysis. In this example, the CSP generation component is also implemented using EKS, but any suitable Kubernetes service could also be used. The policies generated by the CSP generation component could comprise CSP policy directives, SRI integrity hash values, approved origins, trusted domains, and any other information that may be used for CSP and SRI policy deployment. In some implementations, such policies can be created manually through a dashboard as well.

Once the policies are dynamically generated, the policies are deployed to help protect the web application. In this example, the CSP policy deployment mechanism provides integration with the web server and different CDNs to push or pull the periodically-generated or updated policies to protect the web application without actively modifying web pages or application servers. Without employing the above techniques, CSP policies often require manual creation and updating, which results in policies remaining static and outdated for long periods of time, rendering them largely ineffective. Beneficially, the dynamic policy creation and deployment techniques disclosed herein help to prevent digital skimming attacks proactively, without requiring any changes to the web application, servers, or CDNs. By providing greater visibility into third-party web assets and integration with CDNs and security solutions without actively modifying web applications, digital skimming attacks that often originate through third-party JavaScript code and other web assets are more rapidly identified and prevented. Another communication system that may be used to detect digital skimming attacks on a web service will now be described with respect to FIG. 2.

FIG. 2 illustrates communication system 200 which may be used to detect digital skimming attacks on a web service in an exemplary embodiment. Communication system 200 provides an example of a system that may be used to implement a digital skimming detection process to facilitate prevention of malicious attacks on a web service as described herein. Communication system 200 provides an example of one possible implementation of a digital skimming detection and protection architecture that may be employed to implement a digital skimming detection process as described herein, but note that other implementations could employ different architectures with additional and/or alternative components, services, and systems. In this example, communication system 200 includes client computing system 201, communication network 220, web server 230, cloud services 235, computing system 236, content delivery networks (CDNs) 240, and third-party service providers 250. An operation that may be employed to facilitate prevention of malicious attacks on a web service will now be described with respect to FIG. 3.

FIG. 3 is a flow diagram that illustrates an exemplary operation 300 to facilitate prevention of malicious digital skimming attacks on a web service. The operation 300 shown in FIG. 3 may also be referred to as digital skimming detection process 300 herein. The steps of the operation are indicated below parenthetically. The following discussion of operation 300 may proceed with reference to elements of FIG. 2 in order to illustrate its operations, but note that the details provided in FIG. 2 are merely exemplary and not intended to limit the scope of process 300 to the specific implementation shown in FIG. 2. Operation 300 may also be combined with the techniques described above with respect to FIG. 1 in some implementations.

Operation 300 may be employed to facilitate prevention of malicious attacks on a web service. As shown in the operational flow of process 300, computing system 236 crawls web resources associated with the web service to obtain information about internal and external web assets associated with the web service (301). In at least one implementation, the web resources associated with the web service could be crawled by passively scanning a website provided by the web service and any associated uniform resource identifiers (URIs) using a scalable system of crawlers. The crawlers may be implemented on an independent server computing system or supplied by a cloud service provider in some implementations. The information obtained about the internal and external web assets associated with the web service could comprise information about JavaScript assets, cascading style sheets (CSS), HTML frames and other code, fonts, images, audio and video files, embeddable objects such as Java™ applets, and the domains to which these scripts and other assets communicate with or send data outbound from pages belonging to the web service. In some examples, the internal web assets could comprise any internal first-party web assets that are included by the web service owner directly, and the external web assets could comprise any external third-party web assets that are indirectly included and managed by external third-party service providers.

Computing system 236 intercepts responses from the internal and external web assets and dynamically injects content security policy headers into the responses to determine internal and external dependency data associated with the internal and external web assets (302). In some implementations, intercepting the responses from the internal and external web assets and dynamically injecting the content security policy headers into the responses could comprise utilizing browser automation with a browser extension to intercept the responses from the internal and external web assets and dynamically inject the content security policy headers into the responses to determine all internal and external dependencies associated with the internal and external web assets. For example, computing system 236 could intercept the responses from the internal and external web assets using headless browser automation with a specialized security scanner browser extension that intercepts and injects a CSP header into the responses received from the internal and external web assets associated with the web service to collect CSP and SRI information. The browser automation and CSP header injection may be implemented on an independent server computing system or supplied by a cloud service provider in some implementations. In at least one implementation, the browser automation loads each page and uses a built-in CSP report-only mechanism (i.e., HTTP Content-Security-Policy-Report-Only response header) to determine and report the internal and external dependency data. For example, computing system 236 could utilize the browser automation with the browser extension to intercept the responses from the internal and external web assets and dynamically inject content security policy report-only response headers into the responses to determine the internal and external dependency data associated with the internal and external web assets. In some implementations, the CSP report-only mechanism may be used to report all internal and external dependencies to a CSP gateway in a CSP report. In some examples, the internal dependencies could comprise any internal first-party dependencies associated with internal first-party web assets that are included by the web service owner directly, and the external dependencies could comprise any external third-party dependencies associated with external third-party web assets that are indirectly included and managed by external third-party service providers.

Computing system 236 processes the internal and external dependency data with script reputation and domain reputation data to generate enriched dependency graph data (303). In some implementations, the internal and external dependency data is first stored as raw data in a database or some other storage system, and the raw dependency data is then enriched with the script reputation and the domain reputation data to generate the enriched dependency graph data. In at least one implementation, computing system 236 could process the internal and external dependency data to enrich the raw internal and external dependency data from the CSP report with the script reputation and domain reputation data and persist the enriched dependency data in graph format to a graph database.

In some implementations, the script reputation and domain reputation data may be based on both publically-available reputation information and internal reputation monitoring and scoring algorithms. For example, the script reputation and domain reputation data could include any information about known attacks associated with any of the scripts or domains, along with domain registration information, domain name servers, internet protocol (IP) addresses of the domains, length of time that a domain has been registered, the expiration date of the domain registration, the identity of the registrar and registrant, other domains that the registrant has registered before and whether any of those sites were associated with security risks or malicious or suspicious activity, and any other publically-available data. This publically-available information could then be processed through internal threat intelligence databases that identify particular IP addresses and hosting providers that have been associated with malicious attacks in the past in order to determine the script reputation and domain reputation data that may be used to generate the enriched dependency graph data. In some implementations, the domain reputation data could comprise name server reputation data, IP address reputation data, and hosting provider reputation data. For example, there are particular hosting platforms, IP addresses, and name servers that are commonly used to host malware or command-and-control servers controlled by attackers, and such servers are also often used to host other illegitimate activities such as media pirating, online gambling, and illegal file sharing. In another example, the ratio of the number of unique domains to number of unique companies or entities could be calculated for a particular hosting platform or name server to determine a security risk factor associated with that host or server. For example, a hosting infrastructure that tends to be exploited by malicious users will have a ratio of the number of unique domains to number of unique companies closer to 1:1, where every domain belongs to a different company or entity. However, because legitimate websites tend to register many different variations of their top-level domain (TLD) using the same hosting platform and name server, a more legitimate provider will have a ratio that is lower than 1:1, such as 2:1 or even 3:1, for example. In at least one implementation, each of the above factors and considerations could be scored individually and then compiled together to form an overall reputation score for each domain or script in the script reputation and domain reputation data, which can then be used to enrich the internal and external dependency data to generate the enriched dependency graph data. The internal and external dependencies associated with the internal and external web assets of the web service are thus processed with the script reputation and domain reputation data to enrich the data and process the results into graph data for analysis.

Computing system 236 analyzes the enriched dependency graph data to dynamically generate content security policies for the web service (304). In at least one implementation, the content security policies could include subresource integrity (SRI) hash values and other SRI policies to utilize in conjunction with the content security policies. Further, in at least one implementation, the content security policies could be created manually through a dashboard as well. Some examples of the policies that may be dynamically generated by analyzing the enriched dependency graph data include CSP policy directives, SRI integrity hash values, cross-origin resource sharing (CORS) settings attributes, approved origins, trusted domains, and any other information that may be used for CSP and SRI policy deployment. In some implementations, the content security policies for the web service may be dynamically generated periodically from graph data analysis on the internal and external dependency data that has been enriched with the script reputation and domain reputation data and rendered in graph format as the enriched dependency graph data. This periodic graph data analysis works to dynamically generate the content security policies on a regular basis, which ensures that the policies remain effective and are always kept up to date.

Computing system 236 deploys the dynamically generated content security policies to protect the web service (305). In some implementations, the content security policies may be deployed to the web server 230 to help protect the web service, which may be deployed periodically to help ensure the policies are kept current and regularly updated. In at least one implementation, the content security policies may also be deployed to a content delivery network as well, such as one or more of the CDNs 240. For example, to deploy the policies to protect the web service, the system may include integration with different CDNs 240 to push or pull the dynamically-generated and periodically-updated policies to protect the web application without actively modifying the web pages or application servers associated with the web service. In some implementations, the content security policies may be deployed via CDNs 240 and application integration. For example, after the content security policies are generated, the policies may be fed back to the origination point, either the CDNs 240 or the web server 230, which can then take action to enforce the security policies by including the policies in their web pages.

Advantageously, the techniques disclosed herein strongly protect web applications from digital skimming attacks, without requiring any changes to the web application, servers, or CDNs. By passively scanning web applications using a scalable system of crawlers, enriching the data with script and domain reputation information, and performing graph analysis to dynamically generate content security policies, web applications and CDNs can continuously receive updated policy information and prevent digital skimming attacks proactively by enforcing the security policies. Further, by providing visibility into third-party dependencies and information about the reputation of the domains that assets on the website communicate with, website owners are better informed of the JavaScript code and other web assets that are being rendered on a website at the client browser level, and can engage in enforcement of security policies designed to protect their site from digital skimming attacks.

FIG. 4 illustrates communication system 400 which may be used to detect digital skimming attacks on a web service in an exemplary embodiment. Communication system 400 provides an example of a system that may be used to implement a digital skimming detection process to facilitate prevention of malicious attacks on a web service as described herein. Communication system 400 provides an example of one possible implementation of a digital skimming detection and protection architecture that may be employed to implement a digital skimming detection process as described herein, but note that other implementations could employ different architectures with additional and/or alternative components, services, and systems. In this example, communication system 400 includes web server 430, computing system 440, content delivery networks, a communication network, web assets 410, reputation data, and web client 401. An exemplary operation of communication system 400 will now be discussed with respect to FIG. 5.

FIG. 5 is a sequence diagram that illustrates an operation of communication system 400 to prevent and detect digital skimming attacks in an exemplary embodiment. Although the following description of FIG. 4 will proceed with reference to elements of communication system 300 of FIG. 3 in this example, the techniques described below with respect to FIG. 4 could also be executed by the systems of communication system 200 such as computing system 236, and could be combined with operation 300 of FIG. 3 in some implementations.

Initially, computing system 440 operates to obtain URLs of web assets 410 associated with the website to be protected. In this example, web assets 410 include both first-party web assets provided by the website owner and external web assets provided by third parties. In at least one implementation, the URLs could be provided manually by submitting the URLs to computing system 440, but computing system 440 may also analyze the web pages of the website received from web server 430 in order to automatically identify URLs associated with the website in some implementations. For example, computing system 440 could crawl the website to get information about web assets 410 and the domains to which these assets call or send data outbound from pages belonging to the website being protected. In some implementations, cron jobs could also be created to automate the process of periodically re-crawling existing URLs to obtain updated information about web assets 410.

Computing system 440 intercepts responses from web assets 410 and dynamically injects a CSP header into each response to collect CSP and SRI information and determine dependencies of web assets 410. In at least one implementation, computing system 440 utilizes headless browser automation with a security scanner browser extension to intercept the responses from web assets 410 and dynamically inject the CSP headers into the responses to determine all internal and external dependencies associated with the web assets 410. For example, the browser automation may load each web page and utilize a built-in CSP report-only mechanism (i.e., HTTP Content-Security-Policy-Report-Only response header) to determine and report the internal and external dependency data of web assets 410.

Computing system 440 then enriches the dependencies associated with web assets 410 with script reputation and domain reputation data and persists the enriched data in graph format to a graph database. In at least one implementation, the internal and external dependencies associated with web assets 410 are first stored as raw data in a database or some other storage system, and the raw dependency data is then enriched with the script reputation and domain reputation data to generate the enriched dependency graph data. In some implementations, the script reputation and domain reputation data may be based on both publically-available reputation information and internal reputation monitoring and scoring algorithms.

After the enriched dependency graph data is stored, computing system 440 periodically generates CSP policies based on graph data analysis. In at least one implementation, the CSP policies could include SRI hash values and other security policies to utilize in conjunction with the CSP policies. Some examples of the security policies that may be periodically generated by analyzing the enriched dependency graph data include CSP directives, SRI hash values, CORS settings attributes, approved origins, trusted domains, and any other information that may be used for CSP and SRI policy deployment. This periodic graph data analysis works to dynamically generate the CSP policies on a regular basis, which ensures that the policies remain effective and are always kept up to date.

Computing system 440 then deploys the CSP policies to protect the website. In this example, the CSP policies are deployed to web server 430, and may be deployed periodically to help ensure the policies are kept current and regularly updated. In some implementations, the CSP policies may also be deployed to one or more content delivery networks as well. For example, to deploy the policies to protect the website, computing system 440 may include integration with different CDNs to push or pull the periodically-updated CSP policies to protect the website without actively modifying the web pages or application servers associated with the website.

After the CSP policy deployment, when the web client 401 accesses the website URLs, web client 401 will receive responses that include CSP directives, SRI hash values, and other information that may be used for CSP and SRI policy deployment. The web browser executing on the web client 401 can then verify that web assets 410 are valid and received from known trusted sources as determined from the CSP directives and SRI hash values. Advantageously, these dynamic policy creation and deployment techniques help to prevent digital skimming attacks proactively, without actively modifying web pages or requiring any changes to the website, web server 430, or CDNs. Further, by providing greater visibility into third-party dependencies of web assets 410 and reputation information associated with web assets 410, digital skimming attacks that often originate through third-party JavaScript code and other web assets 410 can be more rapidly detected and prevented, thereby greatly increasing the security of the website.

Now referring back to FIG. 2, communication system 200 includes client computing system 201, communication network 220, web server 230, cloud services 235, computing system 236, content delivery networks 240, and third-party service providers 250. Client computing system 201 and communication network 220 communicate over communication link 211. Communication network 220 and content delivery networks 240 communicate over communication link 242, while communication network 220 and third-party service providers 250 are in communication over communication link 252. Communication network 220 and web server 230 are in communication over communication link 221. Web server 230 and cloud services 235 communicate over communication link 231, while web server 230 and content delivery networks 240 are in communication over communication link 241. Web server 230 and third-party service providers 250 communicate over communication link 251. Cloud services 235 and content delivery networks 240 communicate over communication link 233, while cloud services 235 and third-party service providers 250 are in communication over communication link 232. In at least one implementation, computing system 236 may be utilized to implement a digital skimming detection process to facilitate prevention of malicious attacks on a web service as described herein. In this example, computing system 236 is shown as part of cloud services 235, but computing system 236 could be an independently operated server computing system implemented separately from cloud services 235 in some implementations. In such implementations, computing system 236 could be in communication directly with web server 230, content delivery networks 240, and third-party service providers 250 over separate communication links and networks that do not include cloud services 235, but such network topology is not shown in FIG. 2 for clarity.

Client computing system 201 comprises a processing system and communication transceiver. Client computing system 201 may also include other components such as a user interface, data storage system, and power supply. Client computing system 201 may reside in a single device or may be distributed across multiple devices. Examples of client computing system 201 include mobile computing devices, such as cell phones, tablet computers, laptop computers, notebook computers, and gaming devices, as well as any other type of mobile computing devices and any combination or variation thereof. Examples of client computing system 201 also include desktop computers, server computers, and virtual machines, as well as any other type of computing system, variation, or combination thereof.

Communication network 220 could comprise multiple network elements such as routers, gateways, telecommunication switches, servers, processing systems, or other communication equipment and systems for providing communication and data services. In some examples, communication network 220 could comprise wireless communication nodes, telephony switches, Internet routers, network gateways, computer systems, communication links, or some other type of communication equipment, including combinations thereof. Communication network 220 may also comprise optical networks, asynchronous transfer mode (ATM) networks, packet networks, local area networks (LAN), metropolitan area networks (MAN), wide area networks (WAN), or other network topologies, equipment, or systems, including combinations thereof. Communication network 220 may be configured to communicate over metallic, wireless, or optical links. Communication network 220 may be configured to use time-division multiplexing (TDM), Internet Protocol (IP), Ethernet, optical networking, wireless protocols, communication signaling, or some other communication format, including combinations thereof. In some examples, communication network 220 includes further access nodes and associated equipment for providing communication services to several computer systems across a large geographic region.

Web server 230 may be representative of any computing apparatus, system, or systems that may connect to another computing system over a communication network. Web server 230 comprises a processing system and communication transceiver. Web server 230 may also include other components such as a router, server, data storage system, and power supply. Web server 230 may reside in a single device or may be distributed across multiple devices. Web server 230 may be a discrete system or may be integrated within other systems, including other systems within communication system 200. Some examples of web server 230 include database systems, desktop computers, server computers, cloud computing platforms, and virtual machines, as well as any other type of computing system, variation, or combination thereof. In some examples, web server 230 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Cloud services 235 comprise any cloud computing platform that provides computing services over a communication network. Cloud services 235 may be representative of any computing apparatus, system, or systems that may connect to another computing system over a communication network. In this example, cloud services 235 comprise computing system 236. Computing system 236 may be representative of any computing apparatus, system, or systems on which the techniques disclosed herein or variations thereof may be suitably implemented. Computing system 236 comprises a processing system and communication transceiver. Computing system 236 may also include other components such as a router, server, data storage system, and power supply. Computing system 236 may reside in a single device or may be distributed across multiple devices. Computing system 236 may be a discrete system or may be integrated within other systems, including other systems within communication system 200. Some examples of computing system 236 include database systems, desktop computers, server computers, cloud computing platforms, and virtual machines, as well as any other type of computing system, variation, or combination thereof. In some examples, computing system 236 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Content delivery networks 240 may be representative of any computing apparatus, system, or systems that may connect to another computing system over a communication network. Content delivery networks 240 comprise a processing system and communication transceiver. Content delivery networks 240 may also include other components such as a router, server, data storage system, and power supply. Content delivery networks 240 may reside in a single device or may be distributed across multiple devices. Content delivery networks 240 may be a discrete system or may be integrated within other systems, including other systems within communication system 200. Some examples of content delivery networks 240 include database systems, desktop computers, server computers, cloud computing platforms, and virtual machines, as well as any other type of computing system, variation, or combination thereof. In some examples, content delivery networks 240 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Third-party service providers 250 may be representative of any computing apparatus, system, or systems that may connect to another computing system over a communication network. Third-party service providers 250 comprise a processing system and communication transceiver. Third-party service providers 250 may also include other components such as a router, server, data storage system, and power supply. Third-party service providers 250 may reside in a single device or may be distributed across multiple devices. Third-party service providers 250 may be a discrete system or may be integrated within other systems, including other systems within communication system 200. Some examples of third-party service providers 250 include database systems, desktop computers, server computers, cloud computing platforms, and virtual machines, as well as any other type of computing system, variation, or combination thereof. In some examples, third-party service providers 250 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Communication links 211, 221, 231, 232, 233, 241, 242, 251, and 252 use metal, air, space, optical fiber such as glass or plastic, or some other material as the transport medium, including combinations thereof. Communication links 211, 221, 231, 232, 233, 241, 242, 251, and 252 could use various communication protocols, such as TDM, IP, Ethernet, telephony, optical networking, hybrid fiber coax (HFC), communication signaling, wireless protocols, or some other communication format, including combinations thereof. Communication links 211, 221, 231, 232, 233, 241, 242, 251, and 252 could be direct links or may include intermediate networks, systems, or devices.

Referring now to FIG. 6, a block diagram that illustrates computing system 600 in an exemplary implementation is shown. Computing system 600 provides an example of computing system 236, computing system 440, or any computing system that may be used to execute digital skimming detection process 300 or variations thereof, although such systems could use alternative configurations. Computing system 600 includes processing system 601, storage system 603, software 605, communication interface 607, and user interface 609. Software 605 includes application 606 which itself includes digital skimming detection process 300. Digital skimming detection process 300 may optionally be implemented separately from application 606, as indicated by the dashed line in FIG. 6.

Computing system 600 may be representative of any computing apparatus, system, or systems on which application 606 and digital skimming detection process 300 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for digital skimming detection process 300 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 loads and executes portions of software 605, such as digital skimming detection process 300, to facilitate prevention of malicious attacks on a web service. Software 605 may be implemented in program instructions and among other functions may, when executed by computing system 600 in general or processing system 601 in particular, direct computing system 600 or processing system 601 to crawl web resources associated with the web service to obtain information about internal and external web assets associated with the web service. Software 605 may further direct computing system 600 or processing system 601 to intercept responses from the internal and external web assets and dynamically inject content security policy headers into the responses to determine internal and external dependency data associated with the internal and external web assets. Further, software 605 may direct computing system 600 or processing system 601 to process the internal and external dependency data with script reputation and domain reputation data to generate enriched dependency graph data. Software 605 may also direct computing system 600 or processing system 601 to analyze the enriched dependency graph data to dynamically generate content security policies for the web service. Finally, software 605 may direct computing system 600 or processing system 601 to deploy the dynamically generated content security policies to protect the web service.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate prevention of malicious attacks on a web service as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-readable storage media are characterized as primary or secondary storage.

In some examples, if the computer-readable storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or digital skimming detection process 300 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

obtaining a Uniform Resource Locator (URL) of a web asset associated with a website;

crawling the URL to identify an external domain that communicates with the web asset;

intercepting a communication between the web asset and the external domain;

injecting a Content Security Policy (CSP) header into the communication to collect CSP and Subresource Integrity (SRI) information;

determining a dependency of the web asset based on the CSP and SRI information;

generating a dependency graph based on the dependency, script reputation data associated with a script of the web asset, and domain reputation data associated with the external domain;

creating a CSP policy based on the dependency graph; and deploying the CSP policy to protect the website.

2. The method of claim 1 further comprising obtaining the script reputation data and domain reputation data from publicly available reputation information.

3. The method of claim 1 further comprising utilizing a scoring algorithm to generate the script reputation data and domain reputation data.

4. The method of claim 1 further comprising:

intercepting an additional communication between the web asset and an additional external domain;

injecting the CSP header into the communication to collect additional CSP and SRI information;

determining a new dependency of the web asset based on the additional CSP and SRI information;

updating the dependency graph based on the new dependency, the script reputation data associated with the script of the web asset, and additional domain reputation data associated with the additional external domain;

updating the CSP policy based on the updated dependency graph; and deploying the updated CSP policy to protect the website.

5. The method of claim 1 further comprising providing the CSP policy to a web client accessing the website via a browser; and wherein providing the CSP policy causes the browser of the web client to verify the web asset based on the CSP policy.

6. The method of claim 1 further comprising:

determining for a hosting provider or a name server associated with the external domain, a ratio of a number of unique domains to a number of unique companies or entities to determine a risk score of the hosting provider or name server associated with the external domain; and wherein generating the dependency graph comprises generating the dependency graph based on the dependency, the script reputation data, the domain reputation data associated with the external domain, and the risk score.

7. The method of claim 6 further comprising increasing the risk score as the ratio approaches 1:1.

8. A system comprising:

processing circuitry configured to:

obtain a Uniform Resource Locator (URL) of a web asset associated with a website;

crawl the URL to identify an external domain that communicates with the web asset;

intercept a communication between the web asset and the external domain;

inject a Content Security Policy (CSP) header into the communication to collect CSP and Subresource Integrity (SRI) information;

determine a dependency of the web asset based on the CSP and SRI information;

generate a dependency graph based on the dependency, script reputation data associated with a script of the web asset, and domain reputation data associated with the external domain;

create a CSP policy based on the dependency graph; and deploy the CSP policy to protect the website.

9. The system of claim 8 wherein the processing circuitry is further configured to obtain the script reputation data and domain reputation data from publicly available reputation information.

10. The system of claim 8 wherein the processing circuitry is further configured to utilize a scoring algorithm to generate the script reputation data and domain reputation data.

11. The system of claim 8 wherein the processing circuitry is further configured to:

intercept an additional communication between the web asset and an additional external domain;

inject the CSP header into the communication to collect additional CSP and SRI information;

determine a new dependency of the web asset based on the additional CSP and SRI information;

update the dependency graph based on the new dependency, the script reputation data associated with the script of the web asset, and additional domain reputation data associated with the additional external domain;

update the CSP policy based on the updated dependency graph; and deploy the updated CSP policy to protect the website.

12. The system of claim 8 wherein the processing circuitry is further configured to provide the CSP policy to a web client accessing the website via a browser; and wherein providing the CSP policy causes the browser of the web client to verify the web asset based on the CSP policy.

13. The system of claim 8 wherein the processing circuitry is further configured to:

determine for a hosting provider or a name server associated with the external domain, a ratio of a number of unique domains to a number of unique companies or entities to determine a risk score of the hosting provider or name server associated with the external domain; and generate the dependency graph based on the dependency, the script reputation data, the domain reputation data associated with the external domain, and the risk score.

14. The system of claim 13 wherein the processing circuitry is further configured to increase the risk score as the ratio approaches 1:1.

15. One or more non-transitory computer-readable media having instructions stored thereon, that, in response to execution, cause a system comprising a processor to perform operations, the operations comprising:

obtaining a Uniform Resource Locator (URL) of a web asset associated with a website;

crawling the URL to identify an external domain that communicates with the web asset;

intercepting a communication between the web asset and the external domain;

injecting a Content Security Policy (CSP) header into the communication to collect CSP and Subresource Integrity (SRI) information;

determining a dependency of the web asset based on the CSP and SRI information;

generating a dependency graph based on the dependency, script reputation data associated with a script of the web asset, and domain reputation data associated with the external domain;

creating a CSP policy based on the dependency graph; and deploying the CSP policy to protect the website.

16. The computer-readable storage media of claim 15 wherein the operations further comprise obtaining the script reputation data and domain reputation data from publicly available reputation information.

17. The computer-readable storage media of claim 15 wherein the operations further comprise utilizing a scoring algorithm to generate the script reputation data and domain reputation data.

18. The computer-readable storage media of claim 15 wherein the operations further comprise:

intercepting an additional communication between the web asset and an additional external domain;

injecting the CSP header into the communication to collect additional CSP and SRI information;

determining a new dependency of the web asset based on the additional CSP and SRI information;

updating the dependency graph based on the new dependency, the script reputation data associated with the script of the web asset, and additional domain reputation data associated with the additional external domain;

updating the CSP policy based on the updated dependency graph; and deploying the updated CSP policy to protect the website.

19. The computer-readable storage media of claim 15 wherein the operations further comprise providing the CSP policy to a web client accessing the website via a browser; and wherein providing the CSP policy causes the browser of the web client to verify the web asset based on the CSP policy.

20. The computer-readable storage media of claim 15 wherein the operations further comprise:

determining for a hosting provider or a name server associated with the external domain, a ratio of a number of unique domains to a number of unique companies or entities to determine a risk score of the hosting provider or name server associated with the external domain; and increasing the risk score as the ratio approaches 1:1; and wherein generating the dependency graph comprises generating the dependency graph based on the dependency, the script reputation data, the domain reputation data associated with the external domain, and the risk score.

* * * * *